US011025478B2

(12) United States Patent
Wang et al.

(10) Patent No.: US 11,025,478 B2
(45) Date of Patent: Jun. 1, 2021

(54) METHOD AND APPARATUS FOR ANALYSING PERFORMANCE OF A NETWORK BY MANAGING NETWORK DATA RELATING TO OPERATION OF THE NETWORK

(71) Applicant: Telefonaktiebolaget LM Ericsson (publ), Stockholm (SE)

(72) Inventors: MingXue Wang, Westmeath (IE); Robin Grindrod, Westmeath (IE); Jimmy O'Meara, Westmeath (IE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 295 days.

(21) Appl. No.: 15/577,009

(22) PCT Filed: May 27, 2015

(86) PCT No.: PCT/EP2015/061749
§ 371 (c)(1),
(2) Date: Nov. 27, 2017

(87) PCT Pub. No.: WO2016/188571
PCT Pub. Date: Dec. 1, 2016

(65) Prior Publication Data
US 2018/0159719 A1 Jun. 7, 2018

(51) Int. Cl.
*H04L 12/24* (2006.01)
*H04L 12/26* (2006.01)
(Continued)

(52) U.S. Cl.
CPC ...... *H04L 41/024* (2013.01); *G06F 16/24578* (2019.01); *G06F 40/10* (2020.01);
(Continued)

(58) Field of Classification Search
CPC ....... H04L 41/024; H04L 41/00; H04L 43/00; G06F 16/24578; G06F 17/21; G06F 17/271; G06F 17/28
(Continued)

(56) References Cited

U.S. PATENT DOCUMENTS 5,668,897 A * 9/1997 Stolfo ...................... G06K 9/00
382/283
5,687,250 A * 11/1997 Curley ................... G06K 9/036
382/112

(Continued)

FOREIGN PATENT DOCUMENTS

WO          97 45801          12/1997

OTHER PUBLICATIONS

Wang et al., Enterprise search with development for network management system, 2015 IEEE International Congress on Big Data, pp. 430-437 (2015). (Year: 2015).*

(Continued)

*Primary Examiner* — David P Zarka
(74) *Attorney, Agent, or Firm* — Patent Portfolio Builders, PLLC

(57) ABSTRACT

A method for analysing performance of a network by managing network data relating to operation of the network is disclosed. The method comprises receiving a plurality of network data records from at least one network data source, processing the received plurality of network data records into a plurality of network data documents, each network data document corresponding to a received network data record, assembling the plurality of network data documents into document groups, generating statistical data for terms appearing in the document groups, and for at least one term, performing anomaly detection upon the statistical data for the term in the document groups, and detecting an anomaly (Continued)

in the term. The method further comprises performing at least one of identifying the term as an anomalous term, identifying the document group containing the anomaly as an anomalous group, and/or identifying a document containing the anomalous term as an anomalous document.

15 Claims, 6 Drawing Sheets

(51) Int. Cl.
  *G06F 16/2457*  (2019.01)
  *G06F 40/10*  (2020.01)
  *G06F 40/40*  (2020.01)
  *G06F 40/211*  (2020.01)

(52) U.S. Cl.
  CPC ............ *G06F 40/211* (2020.01); *G06F 40/40* (2020.01); *H04L 41/00* (2013.01); *H04L 43/00* (2013.01); *H04L 43/04* (2013.01); *H04L 43/06* (2013.01); *H04L 43/08* (2013.01)

(58) Field of Classification Search
  USPC ......................................................... 709/224
  See application file for complete search history.

(56) References Cited

U.S. PATENT DOCUMENTS

| | | | |
|---|---|---|---|
| 5,881,232 A | 3/1999 | Cheng et al. | |
| 5,963,943 A | 10/1999 | Cummins et al. | |
| 6,141,777 A | 10/2000 | Cutrell et al. | |
| 6,496,831 B1 | 12/2002 | Baulier et al. | |
| 7,519,860 B2 | 4/2009 | Hatonen et al. | |
| 8,495,429 B2 | 7/2013 | Fu et al. | |
| 9,319,421 B2* | 4/2016 | Ferragut | H04L 63/1425 |
| 9,361,463 B2* | 6/2016 | Ferragut | G06F 21/552 |
| 9,699,049 B2* | 7/2017 | Gupta | H04L 41/142 |
| 2004/0117126 A1* | 6/2004 | Fetterman | G06Q 50/24 |
| | | | 702/19 |
| 2005/0091532 A1* | 4/2005 | Moghe | H04L 63/1408 |
| | | | 726/4 |
| 2005/0210016 A1* | 9/2005 | Brunecky | G06F 16/93 |
| 2008/0040088 A1 | 2/2008 | Vankov et al. | |
| 2008/0052015 A1* | 2/2008 | Ozawa | G01R 31/31932 |
| | | | 702/57 |
| 2012/0072859 A1* | 3/2012 | Wang | G06K 9/00442 |
| | | | 715/764 |
| 2012/0221448 A1* | 8/2012 | Evans | G06Q 30/04 |
| | | | 705/34 |
| 2014/0006393 A1* | 1/2014 | Soshin | G06F 16/00 |
| | | | 707/728 |
| 2014/0068360 A1* | 3/2014 | Lai | G11C 29/08 |
| | | | 714/718 |
| 2014/0160941 A1 | 6/2014 | Hui et al. | |
| 2015/0033084 A1* | 1/2015 | Sasturkar | G06F 11/3006 |
| | | | 714/46 |
| 2015/0058982 A1* | 2/2015 | Eskin | G06F 16/84 |
| | | | 726/23 |
| 2015/0089615 A1* | 3/2015 | Krawczyk | G06F 16/93 |
| | | | 726/7 |
| 2015/0131870 A1* | 5/2015 | Hudson | G06F 3/0483 |
| | | | 382/112 |
| 2015/0229662 A1* | 8/2015 | Hitt | H04L 63/1425 |
| | | | 726/23 |
| 2016/0219067 A1* | 7/2016 | Han | H04L 63/1425 |
| 2016/0253598 A1* | 9/2016 | Yamada | G06N 20/00 |
| | | | 706/12 |

OTHER PUBLICATIONS

Anomaly Detection From Network Logs Using Diffusion Maps by Tuomo Sipola et al.; Department of Mathematical Information Technology—2011.

Efficient Anomaly Monitoring Over Moving Object Trajectory Streams by Yingyi Bu et al. (Paris, France)—Jun. 28-Jul. 1, 2009.

Local Anomaly Detection for Mobile Network Monitoring by Pekka Kumpulainen et al.; Information Sciences 178 (2008) 3840-3859—2008.

International Search Report for International Application No. PCT/EP2015/061749—dated Apr. 21, 2016.

Statistical Treatment of Experimental Data, An Introduction to Statistical Methods, Treating experimental errors, Analyzing experimental data, Concept of probability, Distribution of errors, Propagation of errors, Correlations by Hugh D. Young—1962.

* cited by examiner

METHOD AND APPARATUS FOR ANALYSING PERFORMANCE OF A NETWORK BY MANAGING NETWORK DATA RELATING TO OPERATION OF THE NETWORK

PRIORITY

This nonprovisional application is a U.S. National Stage Filing under 35 U.S.C. § 371 of International Patent Application Serial No. PCT/EP2015/061749 filed May 27, 2015, and entitled "Method And Apparatus For Analysing Performance Of A Network By Managing Network Data Relating To Operation Of The Network."

TECHNICAL FIELD

The present invention relates to a method and network element for analysing performance of a network by managing network data relating to operation of the network. The present invention also relates to a computer program product configured, when run on a computer, to carry out a method for analysing performance of a network by managing network data relating to operation of the network.

BACKGROUND

Network operators are constantly performing network analysis and troubleshooting to improve the performance of communication networks. As such networks increase in size and complexity, so the amount and complexity of data relating to the operation of the network also greatly increase. The telecommunications industry in particular has experienced a vast increase in the scale of communication networks, and consequently in the amount of network data generated by such networks, leading to the rise of "big data" management and analysis tools. Despite the wealth of information available regarding the operation of such networks, the size and complexity of the networks renders the discovery of useful information for network analysis and troubleshooting extremely challenging.

Search engines are highly effective at extracting individual data records from vast amounts of search data; however, search engines are ineffective for network analysis and troubleshooting. The ranking models of most search engines are relevance based ranking models, which determine how relevant a data record or document is to a search keyword. Network data containing a higher frequency or count of occurrences of searched keywords would be given a higher ranking and so preferentially presented to a user. However, a higher frequency of occurrence for example a particular network node in network data has no relation to a network problem involving that node. In addition, the vast scale of network data means there may be many thousands of related data documents generated in the few minutes before a network problem occurs. Without additional analysis tools, a network operator is obliged to review these documents manually. Search engine techniques are not therefore helpful for the extraction of data for network analysis and troubleshooting.

In order to enable the extraction of useful information for network analysis and troubleshooting, many application specific network management systems maintain individual network data storage platforms, such as relational databases, object databases, key-value stores and Hadoop file systems. The data stored on these platforms may include logs, events and alarms, etc. generated and collected from managed networks. Each system is designed for its own specific use cases, and collects and stores its own network data in an individual manner, specific to its functionality. The format in which the data is stored is also specific to a particular system, with CSV files, XML files and data tables all commonly used. In most cases, the network data is highly structured and is often in a format specified by standard organisations such as 3GPP or IETF. Application specific queries are often built in to management systems in order to allow for quick network analysis, such as querying an alarm database for alarm severity summary analysis. However, these analysis functions with pre-defined queries are highly specific to individual datasets and functionalities. A particular dataset can therefore only be analysed using the analysis functionality of its specific management system.

A major drawback of existing analysis systems is thus the inability to apply a single analysis system across different random datasets involving multiple data sources. Such analysis is simply not possible, as existing anomaly detection systems generally work with structured or semi-structured data. The analysis system extracts data vectors or matrix based schemas defined for the particular raw data held by the system. This requires all data records to have a similar data structure or format, such as syslog data, clickstream data or KPI records data, in order to build the data matrix. Random datasets across multiple network data sources are simply beyond the capability of existing systems. This is problematic as network data for existing networks may be generated from various network elements and systems and is stored in different data stores. A single type of data store may additionally have multiple different setups for different types of data, with data from different sources generally handled separately. It is therefore almost impossible for a user to get a centralised view, or to correlate network data from different sources. However, such correlation or centralization is often key to understanding what is going on in a network. For example, analysis of alarm data may indicate that multiple alarms have been generated in a short period of time, but a completely separate analysis would be required to determine that that time period followed a particular command entered by a user. Similarly, multiple user session impacts may be identified but current systems have no way of linking these impacts to a configuration event which may have preceded them. The compartmentalization of data and data analysis techniques thus inhibits the extraction of useful network wide intelligence.

Data inconsistency is another common issue which is not well handled by existing analysis systems. Different versions of hardware and software, different vendors and system configurations generate different presentations of machine data which may have exactly the same meaning. For example, a study of 3 hours of data of a small network yielded an air conditioner alarm which appeared in seven different presentations including Air_condition_external_alarm, Air Con, and AIR CONDITIONER. In the tested system it would be extremely difficult for users to address a simple problem such as filtering or finding all air condition alarms. In larger networks with a greater variety of systems and elements, this kind of problem becomes much more significant. Unstructured data offers similar challenges to existing systems, which are in general simply not designed to handle unstructured data. Unstructured data fields may include additional_info in OSS logs, problem_text in alarms; log_lines in network hardware logs etc. These fields may contain very useful information for the analysis of problems, but they are overlooked by existing analysis systems. A user looking to gain insight from such unstructured data fields is obliged to read and analyse them manually.

Network data analysis and troubleshooting thus presents significant challenges for network operators. Network data is stored in various formats and in many different locations. Data structures and specifications are becoming ever more complex and are constantly evolving. Data includes a mix of structured and unstructured information and may be inconsistent owing to different network configurations, different software and hardware, etc. The volume of data available renders increasingly difficult the extraction of useful insights for a network problem, and the limited pre-defined data analysis queries are not flexible enough to work with updated or different data schemas. Developing new data analysis queries requires detailed structural and domain knowledge of the network. Current analysis techniques are therefore significantly lacking in the field of network analysis and troubleshooting.

SUMMARY

It is an aim of the present invention to provide a method, apparatus and computer readable medium which at least partially address one or more of the challenges discussed above.

According to a first aspect of the present invention, there is provided a method for analysing performance of a network by managing network data relating to operation of the network, the method comprising receiving a plurality of network data records from at least one network data source, processing the received network data records into a plurality of network data documents, each document corresponding to a received network data record and assembling the network data documents into document groups. The method further comprises generating statistical data for terms appearing in the document groups, and, for at least one term, performing anomaly detection upon the term statistical data for the document groups, and if an anomaly is detected, performing at least one of identifying the term as an anomalous term, identifying the document group containing the anomaly as an anomalous group and/or identifying a document containing the anomalous term as an anomalous document.

According to examples of the invention, the method may further comprise receiving a plurality of network data records from a plurality of different network data sources. Such data sources may include elements and systems within the network, including Operation Support Systems (OSS), databases including relational databases and object databases, big data platforms or data streams from existing systems within the network. Examples of network data records may include data logs, command and hardware logs, alarms, events, user and radio session data etc. Receiving the network data records may comprise importing, collecting or retrieving data records or receiving data streams.

According to examples of the invention, processing the received network data records into a plurality of network data documents may comprise performing an analysis on the received data records, the analysis comprising at least one of syntactic analysis, text mining or Natural Language Processing. Processing the received network data records may thus enable different data formats to be converted to searchable data documents, and may also enable unstructured data to be taken into account in anomaly detection.

According to examples of the invention, processing the received network data records into a plurality of network data documents may further comprise assembling the results of the analysis for each network data record into the corresponding network data document.

According to examples of the invention, processing the received network data records into a plurality of network data documents may further comprise creating an index of the received network data records and storing the created index in an index store.

According to examples of the invention, assembling the network data documents into document groups may comprise defining a plurality of sliding windows and placing all documents corresponding to a single sliding window in the same document group. In some examples, documents corresponding to a particular window may include documents processed from data records generated during that window, or relating to events taking place during that window.

According to examples of the invention, the sliding windows may comprise sliding windows having a window size defined by at least one of time interval or document count. The document count may comprise the number of documents in a sliding window or the overall size of documents in a sliding window.

According to examples of the invention, a term may comprise a word, compound word or collection of words having a defined meaning within at least one network context.

According to examples of the invention, statistical data for a term may comprise, for each document group, at least one value of a data statistic model for occurrence of the term in the document group.

In some examples, the data statistic model may for example be term frequency or inverse term frequency. In some examples, performing anomaly detection on term statistic data may comprise applying an anomaly detection algorithm to the collection of data statistic model values for the term for each document group, in order to identify an anomalous value.

According to examples of the invention, the method may further comprise repeating, for remaining terms appearing in the document groups, the steps of performing anomaly detection upon the term statistical data for the document groups, and if an anomaly is detected, performing at least one of identifying the term as an anomalous term, identifying the document group containing the anomaly as an anomalous group, and/or identifying a document containing the anomalous term as an anomalous document.

According to examples of the invention, the method may further comprise presenting at least one of identified anomalous terms, identified anomalous groups or identified anomalous documents to a user interface. The identified anomalous terms, document groups or documents may be presented through any appropriate user interface, and in some examples, the sliding window corresponding to an anomalous document group may be presented instead of the document group itself.

According to examples of the invention, the method may further comprise ranking identified anomalous terms based on their frequency of occurrence. In some examples, frequency of occurrence may be frequency of occurrence in a single document group or across all document groups.

According to examples of the invention, the method may further comprise ranking identified anomalous document groups based on the number of anomalous terms in each document group.

According to examples of the invention, the method may further comprise, for at least one identified anomalous term, applying a quantitative anomaly detection algorithm to the term statistical data, the quantitative anomaly detection algorithm configured to return an abnormality score comprising a quantitative value representing a degree of abnormality in the term statistical data.

According to further examples of the invention, performing anomaly detection upon the term statistical data for the document groups may comprise applying a quantitative anomaly detection algorithm to the term statistical data, the quantitative anomaly detection algorithm configured to return an abnormality score comprising a quantitative value representing a degree of abnormality in the term statistical data. An abnormality score greater than a minimum value may be classed as an identified anomaly.

According to examples of the invention, the method may further comprise applying a plurality of quantitative anomaly detection algorithms to the term statistical data, and averaging the returned abnormality scores to generate a combined abnormality score for the term.

According to examples of the invention, averaging the returned abnormality scores may comprise calculating a weighted average including a weighting factor determined by at least one of a machine learning process or a network operator. The network operator may for example be a human expert, whose knowledge and experience may be encapsulated in weighting factors applied to certain terms.

According to examples of the invention, the method may further comprise grouping terms having abnormality scores within a threshold separation of each other.

According to examples of the invention, the method may further comprise ranking identified anomalous terms according to their abnormality score.

According to examples of the invention, the method may further comprise generating an abnormality score for document groups based upon anomalous terms appearing in the document groups.

According to examples of the invention, generating an abnormality score for document groups may comprise, for a document group, generating an abnormality score based upon at least one of number of identified anomalous terms in the document group, maximum abnormality score for a term in the document group, and/or cumulative abnormality score for terms in the document group.

According to examples of the invention, the method may further comprise ranking document groups according to their abnormality score.

According to examples of the invention, the method may further comprise generating an abnormality score for a network data document based on the abnormality scores of anomalous terms appearing in the document. The document abnormality score may in some examples be based on cumulative term abnormality score, maximum term abnormality score, number of anomalous terms etc.

According to examples of the invention, generating an abnormality score for a network data document may comprise adjusting the abnormality scores of identified anomalous terms appearing in the document according to associations between the identified anomalous terms. In some examples, associations may be identified in a single document or in the document group, and adjustment may comprise reducing individual scores for terms having high association, ensuring for example that highly associated terms are not counted as double when they frequently appear together in the document or group.

According to examples of the invention, the method may further comprise adjusting the generated abnormality score for the network data document according to frequency of appearance of anomalous terms from the network data document in the rest of the document group.

According to examples of the invention, the method may further comprise ranking network data documents according to their abnormality score. In some examples, network data documents may be ranked according to their abnormality score in combination with another ranking measure, for example a relevance score with respect to a received search query.

According to examples of the invention, the method may further comprise receiving a search query, applying the search query to the network data documents, and assembling the network data documents into document groups after application of the search query.

According to examples of the invention, applying the search query to the network data documents may comprise filtering the network data documents to retain only those network data documents having a relevance score with respect to the search query above a threshold value. In some examples, a search query may for example be a particular network node or a specific time period. A relevance score may be generated for terms, documents or document groups with respect to a search query using search and ranking techniques.

According to examples of the invention, the method may further comprise adjusting the generated abnormality score for the network data document according to a relevance score of the network data document with respect to the received search query. In further examples, network data documents may be ranked according to a combination of both the unadjusted abnormality score and a relevance score for the received search query.

In some examples, the search query may be received and applied after an initial running of the method steps, and so may be received in light of previously identified anomalous terms, document groups or network data documents.

According to another aspect of the present invention, there is provided a computer program configured, when run on a computer, to carry out a method according to the first aspect of the present invention.

According to another aspect of the present invention, there is provided a computer program product comprising computer readable material, the computer readable material having stored thereon a computer product according to the preceding aspect of the present invention.

According to another aspect of the present invention, there is provided a network element for analysing performance of a network by managing network data relating to operation of the network, the network element comprising a processor and a memory, the memory containing instructions executable by the processor such that the network element is operable to receive a plurality of network data records from at least one network data source, process the received network data records into a plurality of network data documents, each document corresponding to a received network data record, and assemble the network data documents into document groups. The network element is further operable to generate statistical data for terms appearing in the document groups, and, for at least one term, perform anomaly detection upon the term statistical data for the document groups and if an anomaly is detected, perform at least one of identifying the term as an anomalous term, identifying the document group containing the anomaly as an anomalous group, and/or identifying a document containing the anomalous term as an anomalous document.

According to examples of the invention, the network element may be further operable to process the received network data records into a plurality of network data documents by performing an analysis on the received data records, the analysis comprising at least one of syntactic analysis, text mining or Natural Language Processing.

According to examples of the invention, the network element may be further operable to assemble the network data documents into document groups by defining a plurality of sliding windows and placing all documents corresponding to a single sliding window in the same document group.

According to examples of the invention, the network element may be further operable to perform anomaly detection upon the term statistical data for the document groups by applying a quantitative anomaly detection algorithm to the term statistical data, the quantitative anomaly detection algorithm configured to return an abnormality score comprising a quantitative value representing a degree of abnormality in the term statistical data.

According to examples of the invention, the network element may be further operable to receive a search query, apply the search query to the network data documents, and assemble the network data documents into document groups after application of the search query.

According to another aspect of the present invention, there is provided a network element for analysing performance of a network by managing network data relating to operation of the network, the network element comprising a receiving unit configured to receive a plurality of network data records from at least one network data source, a search unit configured to process the received network data records into a plurality of network data documents, each document corresponding to a received network data record, and a processing unit configured to assemble the network data documents into document groups. The network element further comprises a data unit configured to generate statistical data for terms appearing in the document groups, and an anomaly unit configured to, for at least one term, perform anomaly detection upon the term statistical data for the document groups, and, if an anomaly is detected, perform at least one of identifying the term as an anomalous term, identifying the document group containing the anomaly as an anomalous group, and/or identifying a document containing the anomalous term as an anomalous document.

BRIEF DESCRIPTION OF THE DRAWINGS

For a better understanding of the present invention, and to show more clearly how it may be carried into effect, reference will now be made, by way of example, to the following drawings in which.

DETAILED DESCRIPTION

Figure 1:
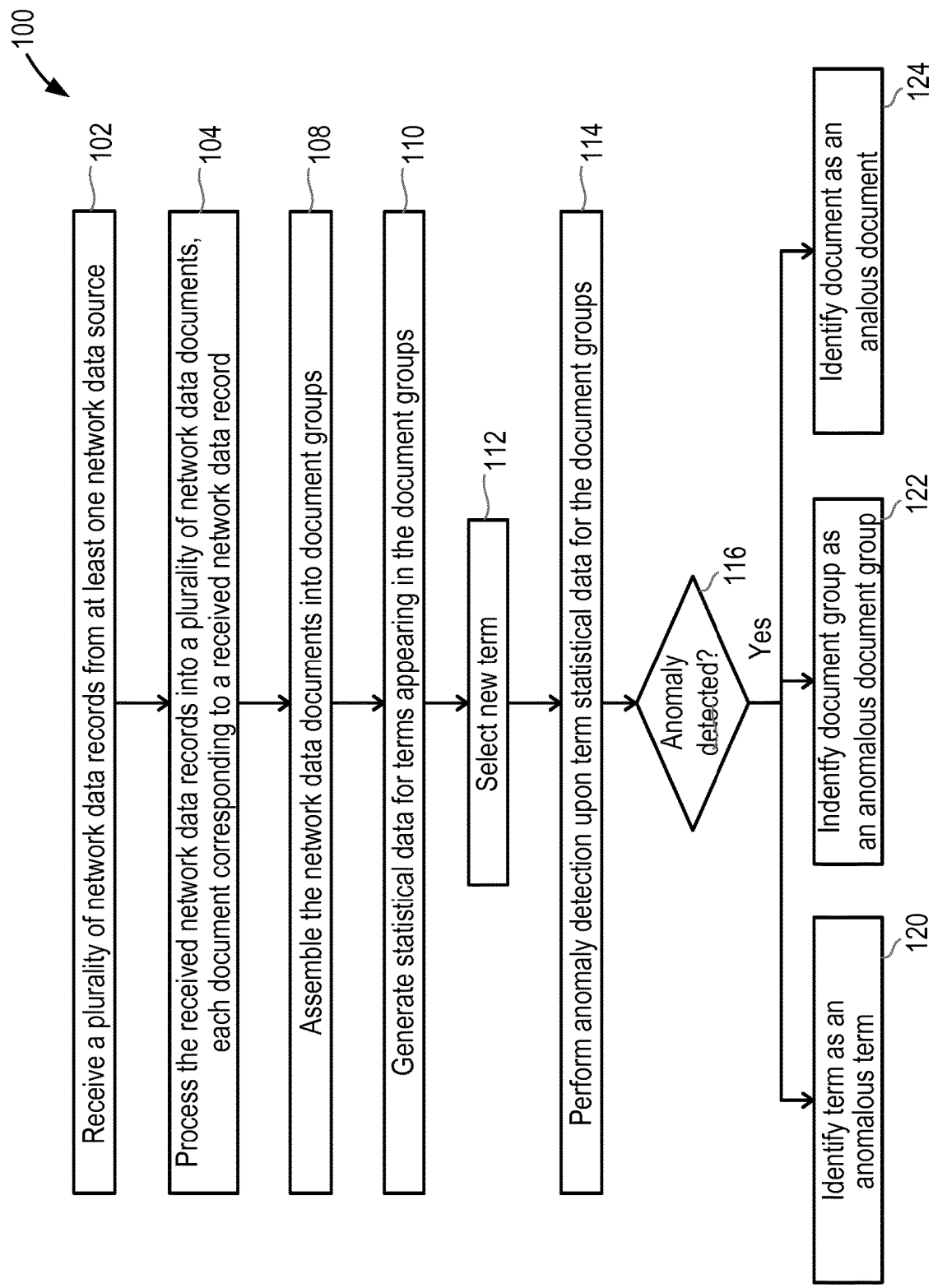
FIG. 1 is a flow chart illustrating process steps in a method for analysing performance of a network by managing network data relating to operation of the network.

Examples of the present invention provide a method combining aspects of information retrieval with anomaly detection techniques to enable management of a wide range of data having different formats and originating from different data sources. The method enables data analysis without the need for development of highly targeted specific algorithms directed to the multiple different types and sources of data which may be available within a network, and which may contain useful intelligence for analysis and troubleshooting of network performance.

A brief discussion of information retrieval and anomaly detection techniques is provided below for the purpose of context.

Information retrieval involves the location of specific information relevant to a search query from a collection of information resources. Internet search engines are commonly known examples of information retrieval applications. Information retrieval involves the use of advanced text analytic functions including tokenizing, stemming and term document matrix building to enable processing of unstructured data, which data is then compiled into an index store. The index store responds to a search query with data matching the search query. A ranking model is then used to calculate how the matched data is sorted and presented to a user, placing the most "interesting" data at the head of the ranked results. Different ranking models are designed for different application scenarios. For example, the well-known PageRank used in Internet search engines uses hyperlink information between web pages to find top ranked web pages for users. Search indexes may also have widely varying designs and data structures, such as citation index and document-term matrix index, according to the lookup speed required and the ranking model to be used with the index store.

In contrast to information retrieval, anomaly detection uses data mining techniques to find items, events and patterns in datasets which do not conform to expected behavior. An anomaly could be a system fault, network intrusion or transaction fraud depending on the particular application domain and system design. A simple example of anomaly detection might involve identifying extreme Key Performance Indicator (KPI) values which greatly deviate from the mean value. As discussed above, anomaly detection in real world telecom data is however a very challenging problem: data is extremely high volume, noisy, complex, unlabeled, and may also be unstructured. In addition, most telecoms data presents some level of temporal behavior and has a collaborative context, meaning it is very difficult to draw a boundary between normal and abnormal behavior in a dataset.

Anomaly detection systems for communication network data are generally designed for a specific application use case including for example HTTP traffic monitoring or real time traffic reporting, with a targeted and well studied data source. These systems are able to parse, understand and analyse the target data to find anomalies from a well-studied boundary.

FIG. 1 illustrates a first example of a method 100 for analysing performance of a network by managing network data relating to operation of the network according to an aspect of the present invention. The network may for example be a telecoms network.

Referring to FIG. 1, the method comprises, in a first step 102, receiving a plurality of network data records from at least one network data source. In step 104, the method comprises processing the received network data records into a plurality of network data documents, each document corresponding to a received network data record. The network data documents are then assembled into document groups in step 108. In step 110, statistical data for terms appearing in the document groups is generated. A term may comprise a word, compound word or collection of words having a defined meaning within a least one network context. In step 112, a term is selected and in step 114, anomaly detection is performed upon the term statistical data for the document groups. If an anomaly is detected in step 116, the term is identified as an anomalous term in step 120, and/or the document group containing the anomaly is identified as an anomalous group in step 122, and/or a document containing the anomalous term is identified as an anomalous document in step 124. The steps of selecting a term, performing anomaly detection and identifying anomalous terms, documents and document groups may be repeated for remaining terms appearing in the received processed data.

Figure 2A:
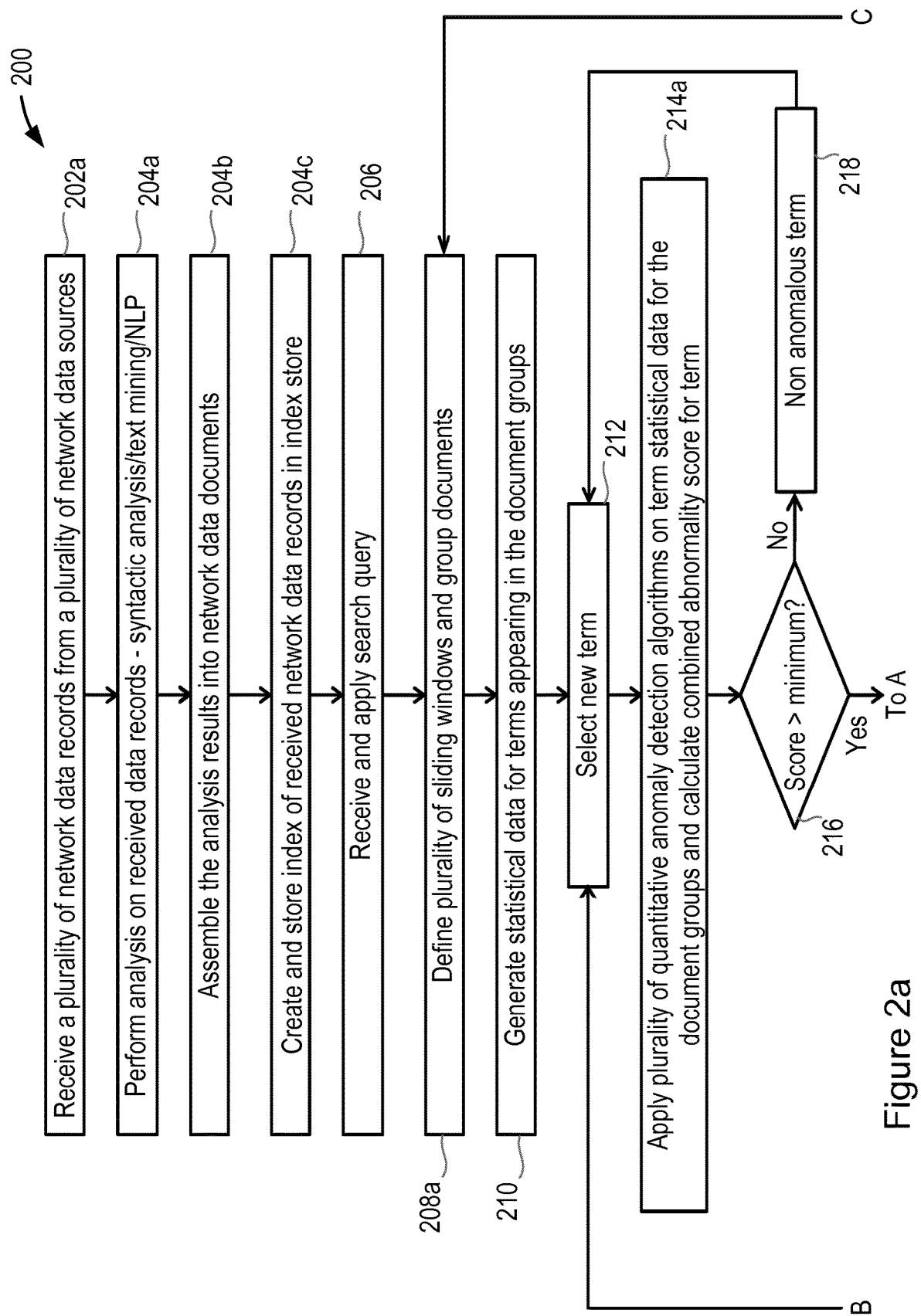
FIGS. 2*a* and 2*b* are a flow chart illustrating process steps in another method for analysing performance of a network by managing network data relating to operation of the network.
Figure 2B:
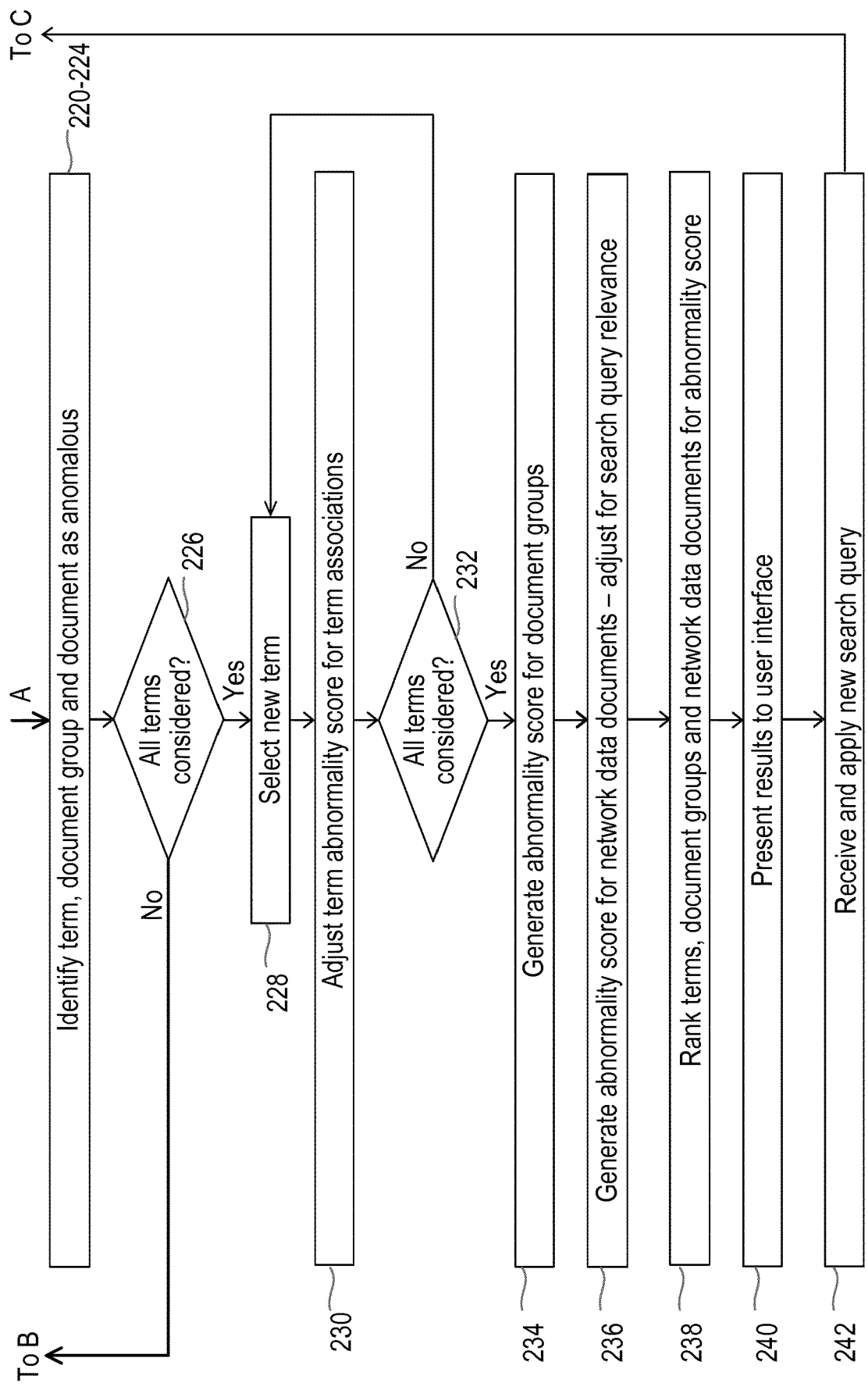

FIGS. 2a and 2b illustrate another example of a method 200 for managing network data relating to operation of a network. The method 200 illustrates one way in which the steps of the method 100 may be implemented and supplemented to provide the above discussed and additional functionality.

Referring to FIG. 2a, in a first step 202a of the method 200, a plurality of network data records are received from a plurality of different network data sources. As discussed above, these records may be alarms, logs etc and may be received from network data stores such as databases, file systems, big data platforms etc. They may also be received as data streams from existing network systems. The data records may be received in a continuous manner or may be imported or requested from the various data sources.

In step 204a, analysis is performed on the received data records in the form of at least one of syntactic analysis or parsing, text mining or Natural language processing (NLP). This analysis may involve transforming terms or words with the same meaning but different presentations, extracting metadata from unstructured data, and enriching data with additional information. The results of the analysis are then assembled into network data documents in step 204b. Each network data document contains the analysis results for a corresponding received data record. An index of the received data records is created on the basis of the performed analysis, and this is stored in an index store in step 204c. The index store enables search queries to be submitted to the received data. A search query may be received from a user in step 206, and applied to the indexed data. Example search queries may include the name of a particular network node, or all information from the last X minutes etc. Applying the query may comprise for example filtering the received data records to retain only data matching the search query. A data document matching the search query may comprise a data document including a term that either matches or is closely related to a search keyword.

In step 208a, a plurality of sliding windows is defined, and documents are grouped according to the sliding window to which they belong. The sliding windows comprise network data snapshots, the size of which may be defined on a fixed time interval (one minute, five minutes etc) or on the basis of documents occurring within the window. For example a sliding window size may be fixed by a document count for the number of documents occurring during the window, or by the total size of documents occurring during the window. A document "occurring" during a sliding window is considered to be a document corresponding to a received data record that was generated during the sliding window, or which relates to an event, alarm or log that took place during the sliding window. Once assembled, each document group corresponds to a particular defined sliding window. If no search query has been received in step 206, the sliding windows may be defined on the basis of all received network data. Alternatively, sliding windows may be defined on the basis of data which has already been filtered according to a received search query.

Figure 6:
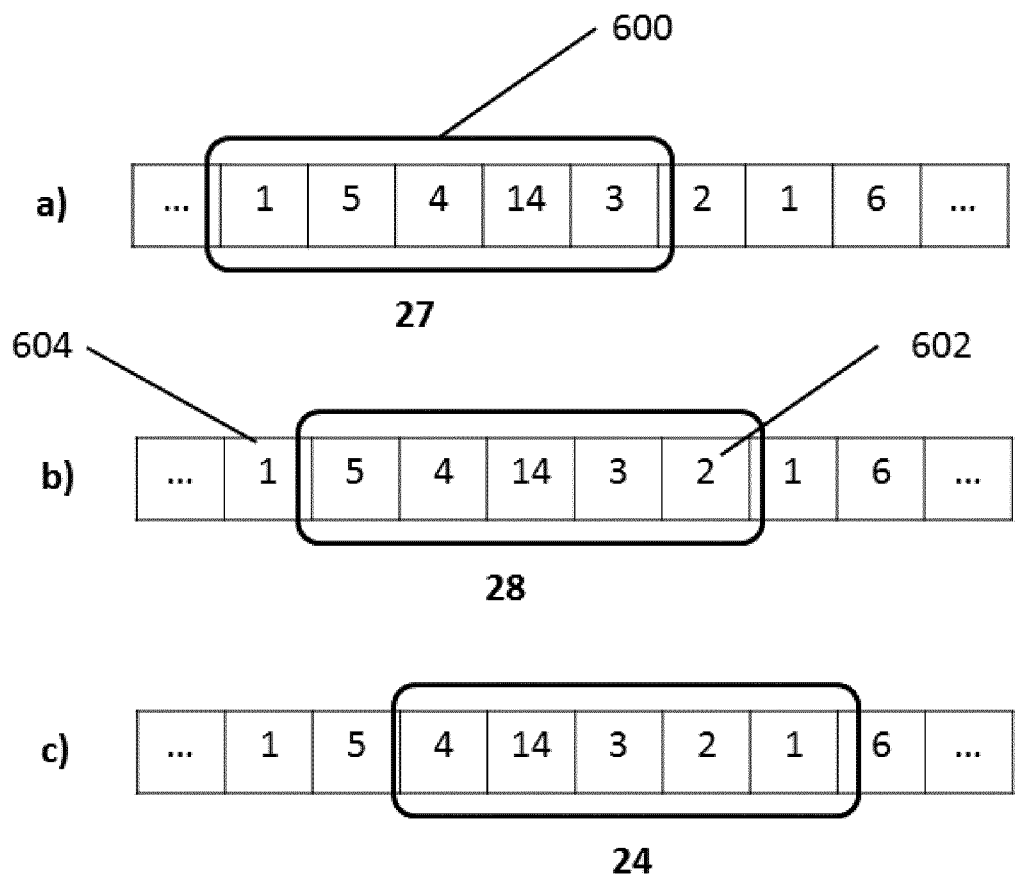
FIG. 6 is an illustration of the concept of a sliding window.

The concept of sliding windows is illustrated in FIG. 6. A communications network run continuously and in consequence generate large amounts of data that grows over time. The challenge is that the data-set is growing and in order to analyse the growing data-set more powerful processing hardware is required. In order to simplify data analysis rather than perform processing of the entire incrementally growing data set the analysis is performed on a limited data set. In this approach, called "sliding window" newly appended data is added to the data-set and oldest data in the data set is discarded.

As shown in FIG. 6 measurement results are presented in cells corresponding to time units, for example one cell corresponds to a time period of 1 minute. The number in the cell is the value measured in the period of time represented by a single cell. In the example a) a sliding window represented by the rectangle 600 includes five cells (i.e. corresponds to five minutes) and the total score from the measurements in the sliding window is 27. When new measurement data is available, 602, it is added to the analysed data-set and the oldest measurement data is discarded, 604. Analysis of the total score in the sliding window returns value of 28. Further addition of a measurement data results in discarding the oldest one as illustrated in example c) and the total score in the sliding window returns value of 24.

In step 210, statistical data is generated for terms appearing in the document groups. As discussed above, a term may comprise a word, compound word or group of words having a defined meaning within at least one network context. For example, a term could be the name of a network element (e.g. "RNC12"), a KPI value (e.g. "qci:7"), an exception message (e.g. "DatastoreManagerImp.java:520"), etc. The statistical data for a term may comprise, for each document group, a value of a data statistic model for occurrence of the term in the document group. The data statistic model may be document frequency; the number of documents in the document group containing the term, or may be inverse document frequency.

In step 212 a new term is selected for anomaly detection. In step 214a, a plurality of quantitative anomaly detection algorithms are applied to the term statistical data for the different document groups, and a combined abnormality score is calculated for the term. The anomaly detection algorithms may identify anomalous values of the term statistical data for individual document groups. For example if a term has a low term frequency value for all but one of the document groups, the term may be considered anomalous in the one document group for which it has a high term frequency value. The term itself and the document group in which the anomaly occur may each be considered to be anomalous.

A quantitative anomaly detection algorithm is an anomaly detection algorithm customised to return a normalised score of abnormality as opposed to a simple true/false value. The abnormality score may range between 0 and 1, or 0 and 100 etc. Individual anomaly detection algorithms may each have particular target applications, and as such may have different strengths and weaknesses. In applying a plurality of anomaly detection algorithms and calculating a combined abnormality score, strengths and weaknesses of individual algorithms in different applications may be balanced out, ensuring that the method remains useful for a wide range of datasets having unknown data structures.

The combined abnormality score for the term under consideration is compared to a minimum threshold in step 216, and if the abnormality score is less than the minimum threshold, the term is not considered to be anomalous in step 218, and a new term is selected for anomaly detection. If the abnormality score is above the minimum threshold, then the term is identified as anomalous in step 220. In addition, any document group containing the anomalous term may be identified as an anomalous document group in step 222, and any document containing the anomalous term may be identified as an anomalous document in step 224. Further discussion of anomaly detection algorithms and calculations is provided below.

In step 226, a check is made as to whether all terms appearing in the document groups corresponding to the defined sliding windows have now been considered. If all terms have not been considered, the method returns to step 212 and selects a new term. If all terms have been considered, the method proceeds to step 228 and again selects a new term for consideration. In step 230, the combined abnormality score for the selected term is adjusted for term associations. Adjustment may allow for specific term combinations in individual documents which may have particular meaning for those documents. For example, "Temperature", "Near" and "Limits" may all be terms having an individual abnormality score. However, in a single document, these terms may appear as the phrase "Temperature is near the specified limits". For the purposes of that particular document, these terms may be considered to be associated, and their abnormality score may be adjusted accordingly. Adjustment of abnormality score for term associations is discussed in greater detail below.

In step 232, a check is made as to whether all terms have been considered for adjustment of their abnormality score. If all terms have not yet been considered, the method returns to step 228 and selects a new term. If all terms have been considered, the method proceeds to step 234 and generates an abnormality score for document groups. This abnormality score may also be represented as the abnormality score for the sliding window with which the document group is associated. The abnormality score for a document group or sliding window may be calculated on the basis of the number of anomalous terms in the document group, on the basis of the maximum abnormality score of terms in the document group, or on the basis of the sum of the abnormality scores of terms in the document group.

In step 236, an abnormality score for individual data documents is generated, and may be adjusted according to a relevance of the document to a received search query. The abnormality score for an individual document may be based upon the number of anomalous terms in the document, the maximum abnormality score of terms in the document, or on the basis of the sum of the abnormality scores of terms in the document. If a search query was received in step 206, then each document may have a relevance score applied to it, indicating the relevance of the document to the received search query. This relevance score may be used to adjust an individual document abnormality score, such that an eventual ranking based upon abnormality score also takes into account the relevance of documents to a received search query. The calculation and adjustment of abnormality scores for document is discussed in greater detail below.

In step 238, terms, document groups or sliding network windows and network data documents may each be ranked according to their (adjusted) abnormality score. These ranked results may then be presented to a user interface in step 240. The ranking on the basis of abnormality score ensures that results that are most likely to relate to a network problem are ranked highest. A user may choose to view sliding network windows, for example to narrow down a time interval during which a problem occurred, or may choose to view terms to identify for example a network element where an anomaly may have occurred, or the nature of a problem. Alternatively, a user may choose to view network data documents, in order to examine documents likely to relate to or describe an anomalous event. In light of the presented results, the user may identify a new search query which would be useful in the identification and analysis of network anomalies. This new search query may be submitted in step 242 and used to define a new set of sliding network windows in step 208a, allowing the method to present a new set of results.

It will be appreciated that in network analysis and troubleshooting, anomalies represent the most important data of a dataset. Examples of the above method enable users to zoom in on only the abnormal data by selecting interesting anomalies. For example, if a user searches for data relating to a particular network element (e.g. RNC77), the method will return anomalies including sliding network windows or document groups, terms and network data documents having a high abnormality score and a high relevance to the searched network element. Among the returned results may for example be the term "reset", and data records containing "reset" may be highly ranked. The user may then check to see if system reset is a cause of the problem rather than go through all data associated with the network element.

In another example application of the method, a network operator may be seeking information about an unknown network anomaly. As the anomaly is unknown, no search query is submitted and the network operator simply views sliding network windows, ranked according to their abnormality score. The highest ranked sliding network window is most likely to contain an anomaly. On investigating documents occurring during that sliding network window, the network operator may identify that a particular anomalous term, for example the name of a network node, occurs very frequently in the anomalous network window. The network operator may thus submit the name of the network node as a search query, in order to obtain document groups, documents and sliding network windows having a particular relevance to the anomalous network node. In this manner, a network user may gradually home in on the root cause of a previously unknown and unidentified network anomaly.

As mentioned above, the following is a more detailed discussion of the algorithms and calculations for anomaly detection and abnormality scoring of anomalous terms, document groups and documents.

The algorithms for anomaly detection are based upon data mining and machine learning techniques. A document group collection $D=\{D_{w1}, D_{w2}, \ldots, D_{wn}\}$ is a finite series of document groups in different sliding windows. $D_{wi}$ is a group of network data documents collected in the window wi, and represents a collection of various network data that occurred in the window.

A data statistic collection $E=\{E_{D_{w1}}, E_{D_{w2}}, \ldots, E_{D_{wn}}\}$ is a series of vector objects which are results of the indexing process of the document collection D. $E_{D_{wi}}=[ds_{t1}^{D_{wi}}, ds_{t2}^{D_{wi}}, \ldots, ds_{tm}^{D_{wi}}]$ is an n-dimensional vector which is from the index of a document group $D_{wi}$. $ds_{t1}^{D_{wi}}$ is one of data statistic models discussed above, such as document frequency $df_{tk}^{D_{wi}}$ or inverse document frequency $idf_{tk}^{D_{wi}}$. $df_{tk}^{D_{wi}}$ is the number of documents containing the term tk; a high score represents more documents containing the term. Inverse document frequency $idf_{tk}^{D_{wi}}$ is calculated from: $idf_{tk}^{D_{wi}}=1+\log(N(D_{wi})/df_{tk}+1)$, where $df_{tk}$ is document frequency for the term tk and $N(D_{wi})$ is the total number of documents in the group $D_{wi}$. The rarer a term is across all documents in the index, the higher the score that the term will get.

A data statistic collection can also be represented as a collection of sliding window sequences collection $E=\{E_{D_{w1,i}}, E_{D_{w2,i+1}}, \ldots, E_{D_{wn-1,n}}\}$. In this case, $E_{D_{w1,i}}$ is a collection of data statistics of window 1 to i. Each window sequence has the same number i for the window.

The output of an anomaly detection algorithm is network or data anomalies. The anomalies may be abnormal sliding network windows or associated document groups, abnormal terms, or abnormal data records. The following illustrates the pseudo code of a main anomaly detection algorithm which may be applied in steps 114 to 124 of method 100 and 214a to 224 of method 200:

Given a data space with multiple terms t1, ..., tn and a data statistic collection $E_{D_{w1}}, \ldots, E_{D_{wn}}$ for these terms
For each term t in the data statistic collection E
Calculate anomalous windows for the t for all windows as W a
For each sliding windows sequence in E
   Calculate anomalous windows for the t in the sliding window sequence Aggregate anomalous windows for all sliding window sequence as Ws
$W_t = W\ a \cap W\ s$ is anomalous windows for the term t
If any term has at least one anomalous window,
then the term is an anomalous term.
If any window has at least one anomalous term,
then the window is an anomalous window.

As discussed above, in the calculation of anomalous windows, a number of data mining techniques can be used separately or together including statistical test, data clustering etc.

Method 200 includes the step of applying anomaly detection to terms by applying a plurality of quantitative anomaly detection algorithms to term statistical data for the document groups, and calculating a combined abnormality score for the term. Any one technique normally targets a specific dataset with specific behavior, and consequently displays specific limitations. For example, statistical tests do not learn temporal patterns, and data clustering techniques cannot detect all sudden permanent changes. As a consequence, a dataset will normally be pre-verified and studied before applying an anomaly detection system. In examples of the methods according to the present invention, a plurality of anomaly detection algorithms are used, overcoming the limitations of any one specific algorithm. Examples of the algorithms used may include statistical test, unsupervised machine learning (e.g. regression/time based analysis), clustering methods, etc. Each algorithm may quantitative, that is it may be customised to give a normalised score of abnormality rather than a true/false value as is usually the case in a standard algorithm implementation. The following simple statistical test based algorithm is an example of a quantitative anomaly detection algorithm. For a given set of values, a score is calculated for each value according to: score=1−cef(abs(x−mean)/standard deviation), where x is a value in the set, abs is an absolute value function and cef is a complementary error function. If a score for a value is greater than a predefined minimum value, then the value is a suspected anomaly, and the abnormally score for the value may be calculated from: (allowance−score)/allowance.

A combined abnormality score may be calculated from scores from n different techniques to determine if a term t is an anomaly:

$$score(t) = \frac{\sum_{i=1}^{n} nor(s_i^t) * w^t}{n}$$

where $nor(s_i)$ is a normalized abnormality score from one customised algorithm implementation. In order to take into account particular knowledge of a network domain, a weighting factor $w^t$ may be defined and applied to the averaging calculation of the normalised abnormality scores. The weighting factor may increase the combined abnormality score for certain critical terms, including for example "restart". The specialist knowledge may be derived from machine learning which has been trained on a labelled data set, if this is available. Otherwise the specialist knowledge may be provided by a human expert. The weighting factor may default to 1 in the absence of specialist knowledge.

The combined abnormality score may be used, before or after adjustment as discussed below, to enable anomalous terms to be ranked on the basis of their occurrence frequency or their abnormality score. Anomalous terms having similar or equal abnormality scores may also be grouped together.

When used for the scoring and ranking of documents, abnormality score of terms may not always give an accurate score or ranking measure of documents, owing to term associations within individual documents. A single data document or corresponding data record could have a very high score caused by multiple unique terms which represent a single meaning or data vector in network data. The example discussed above is "Temperature is near the specified limits . . . " which could contain multiple anomalous terms which should be considered to be grouped together.

As discussed above, this may be overcome by adjusting the abnormality score for individual terms by taking account of term associations. Term association is calculated based on the occurrence of anomalous terms in each document group, or sliding network window. The more frequently multiple terms occur together, the stronger the association confidence is for these terms. If $a_1 \ldots a_n$ is a number of associations identified for a term, then the adjusted abnormality score for the term t is calculated as follows:

$$adjusted\_score(t) = \frac{score(t)}{\sum_{i=1}^{n}(nu(a_i)(1-c(a_i)))}$$

where $nu(a_i)$ denotes the number of terms in the association, and $c(a_i)$ is a probability of the association confidence between the terms. Higher confidence indicates that these terms are more likely to be a phase or word group. Consequently, if a term has higher associations with other terms, then a lower adjusted abnormality score will be calculated for the term. For example, if the terms "high" and "temperature" always occur together in data records, then a combined adjusted abnormality score of the two terms will equal the original value of one term; "high" and "temperature" are in effect counted as a single word group.

The calculation of the abnormality score of a data record or document takes into account the abnormality score of the terms included in the document. It may also take into account the index information or relevance score to a received search query, in order to provide a ranking measure that takes account of both anomaly identification and relevance to a search query. The same anomalous document may have different abnormality scores in different windows, for example, a higher score may be given to a document if an anomalous term appears more frequently in the document or more rarely in that window. If b is a set of anomalous terms that was detected for a window and $d_i$ is a document, the calculation of abnormality score for the document with a user query q can be briefly described as:

$$\text{score}(q, d_i, b) = \frac{V(d_i) \cdot V(q \cap (\bigcup b)) \cdot S(b)}{|V(d_i)||V(q \cap (\bigcup b))|}$$

where V is a vector function for converting any term set as vectors based on index data, and |V| is Euclidean norm of the vector. The S function has the effect of boosting the abnormality score based on abnormality scores of terms in b. As discussed above, the abnormality score for a document may be used to rank data records or documents or to group documents having similar or equal abnormality score. Terms having high abnormality scores may also be highlighted in documents.

Figure 3:
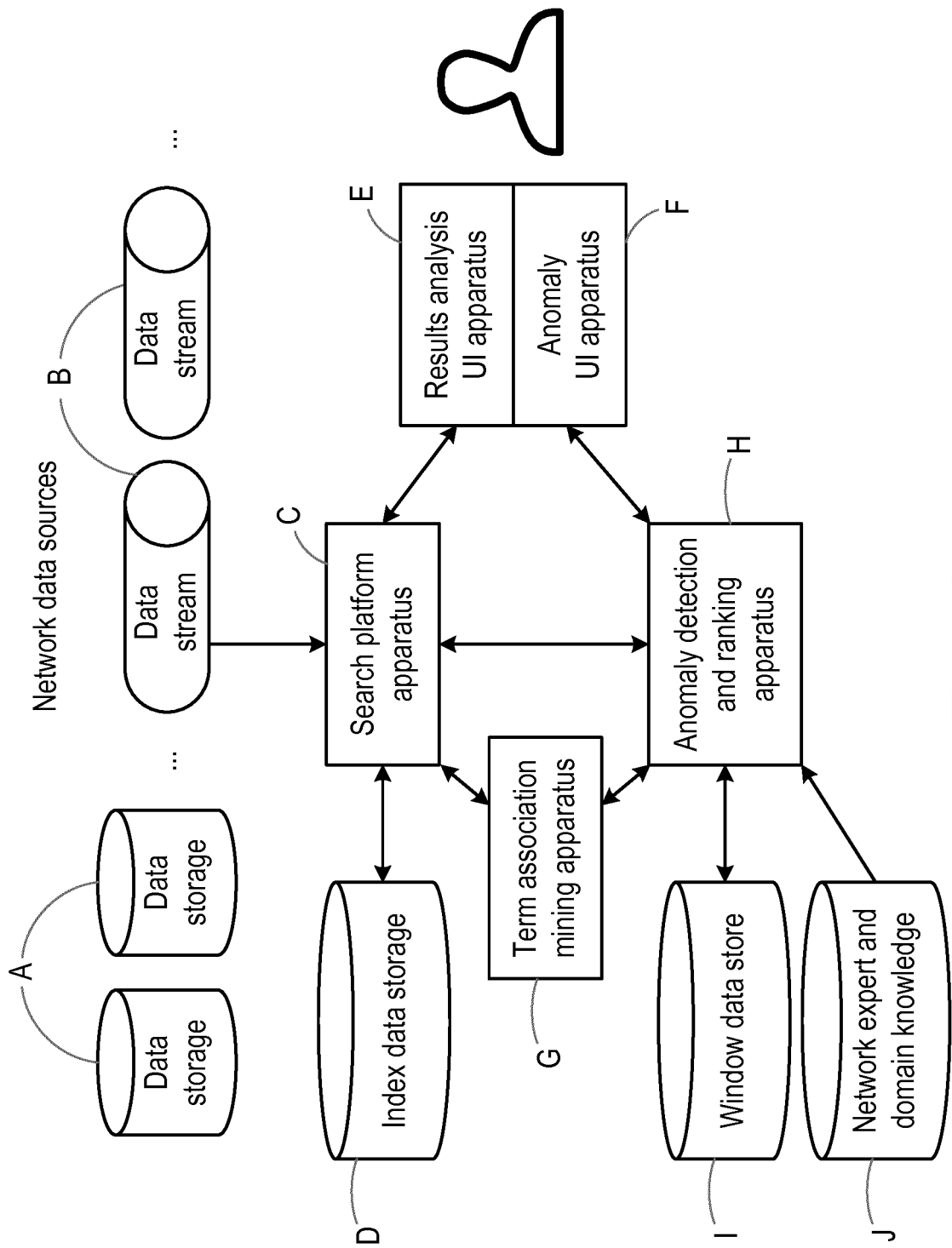
FIG. 3 illustrates process flow through apparatus which may implement the methods of FIGS. 1 and 2.

FIG. 3 illustrates process flow through apparatus which may implement the methods 100, 200 described above. Referring to FIG. 3, data from data sources A and B is imported to or retrieved by a search platform apparatus C. The search platform apparatus C processes the data and creates indexes of the data. The index data is stored in a data storage called an index data store D. At this stage, a user can search or query any data across all data sources though a result analysis User Interface (UI) apparatus E. Searched results are retrieved for users based on the data indexes by the search platform apparatus C. Search results are displayed and may be summarised or categorised for the user by the result analysis UI apparatus E.

Incoming data is divided into different sliding windows and an anomaly detection and ranking apparatus H extracts the necessary data statistics of each sliding window from index data store D though the search platform apparatus C. Data statistics of sliding windows are saved to a window data store I. At this stage, a user can request the system to provide anomaly information of imported data. The anomaly detection and ranking apparatus H uses information from the window data store I to identify data anomalies. Anomalies of all imported data are presented to users through an anomaly UI apparatus F.

A term association mining apparatus G is used to find associations between anomalous terms, grouping associated terms together and providing input data to calculate abnormality scores of individual data records or documents. A network and expert domain knowledge store J contains network specific information which is input to abnormality score calculations. This allows for increase or decrease of the abnormality score for data that is considered more or less important by experts, system users or on the basis of machine learning. This network domain knowledge is taken into account in the abnormality score calculations performed by the anomaly detection and ranking apparatus H. The result analysis UI apparatus E and anomaly UI apparatus F are associated units and may work together to respond to user queries. For example, knowing an anomaly, a user may request the system retrieve data only marked with anomalies. A user may also ask the system to find anomalies from search results.

Figure 4:
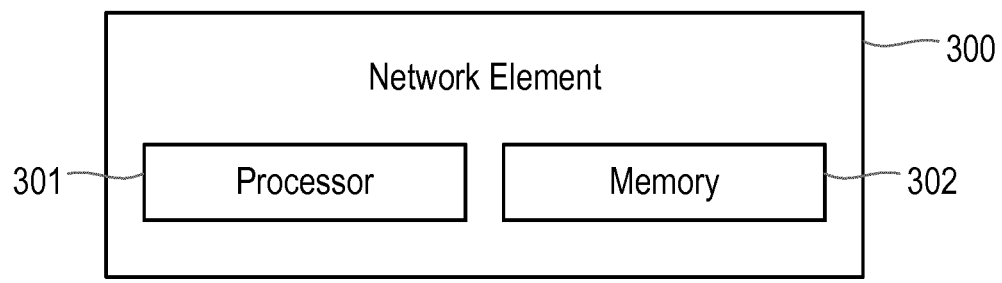
FIG. 4 is a block diagram illustrating functional units in a network element.

Examples of the methods 100, 200 may also be conducted in a network element, which may be a virtual or a physical network element. The methods may be implemented on receipt of suitable computer readable instructions, which may be embodied within a computer program running on a network element. FIG. 4 illustrates a first example of a network element which may execute the methods of the present invention, for example on receipt of suitable instructions from a computer program. Referring to FIG. 4, the network element 300 comprises a processor 301 and a memory 302. The memory 302 contains instructions executable by the processor 301 such that the network element 300 is operative to conduct the steps of the methods 100, 200 of FIGS. 1 and/or 2. The memory may also store measurements and processing data generated during the execution of the methods.

Figure 5:
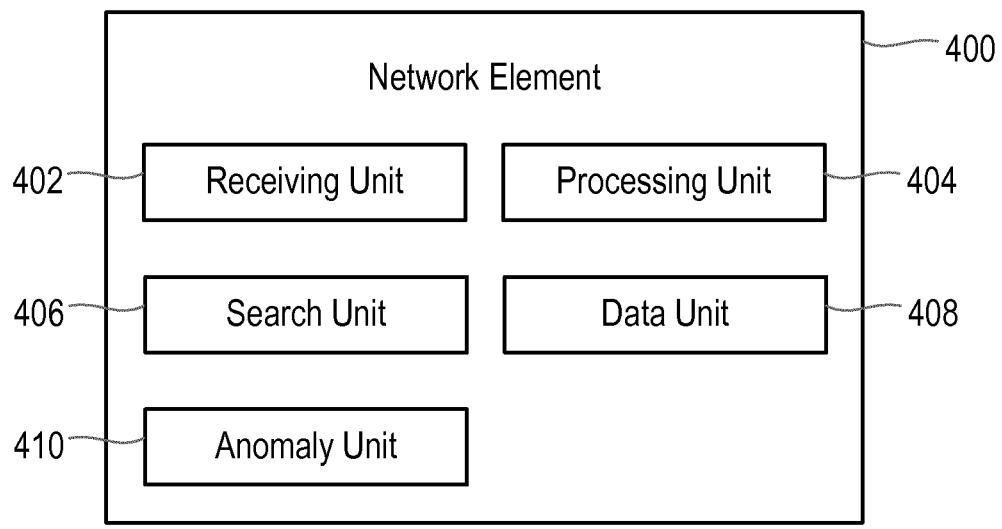
FIG. 5 is a block diagram illustrating functional units in another example of network element.

FIG. 5 illustrates functional units in another example of network element 400 which may execute the methods of the present invention, for example according to computer readable instructions received from a computer program. It will be understood that the units illustrated in FIG. 5 are functional units, and may be realised in any appropriate combination of hardware and/or software. The units may comprise one or more processors and may be integrated to any degree.

Referring to FIG. 5, the network element 400 comprises a receiving unit 402 configured to receive a plurality of network data records from at least one network data source. The network element 400 also comprises a search unit 406 configured to process the received network data records into a plurality of network data documents, each document corresponding to a received network data record, and a processing unit 404 configured to assemble the network data documents into document groups. The network element further comprises a data unit 408 configured to generate statistical data for terms appearing in the document groups, and an anomaly unit 410 configured to, for at least one term, perform anomaly detection upon the term statistical data for the document groups, and, if an anomaly is detected, perform at least one of identifying the term as an anomalous term, identifying the document group containing the anomaly as an anomalous group and/or identifying a document containing the anomalous term as an anomalous document.

The receiving unit 402 may be for receiving data records from a plurality of different data sources, and the processing unit 404 may be for processing the received network data records into a plurality of network data documents by performing an analysis on the received data records, the analysis comprising at least one of syntactic analysis, text mining or Natural Language Processing. The processing unit 404 may also be for assembling the results of the analysis for each network data record into the corresponding network data document and creating an index of the received network data records and storing the created index in an index store. The processing unit 404 may also be for defining a plurality of sliding network windows and placing all documents corresponding to a single network window in the same document group.

The network element may further comprise a User Interface unit for presenting at least one of identified anomalous terms, documents or document groups to a user.

The anomaly unit 410 may also be for ranking identified anomalous terms based on their frequency of occurrence and for ranking identified anomalous document groups based on the number of anomalous terms in each document group. The anomaly unit may also be for applying one or more quantitative anomaly detection algorithms to term statistical data, the quantitative anomaly detection algorithm configured to return an abnormality score comprising a quantitative value representing a degree of abnormality in the term statistical data. The anomaly unit 410 may also be for calculating a combined abnormality score and ranking anomalous terms according to their abnormality score. The anomaly unit 410 may also be for generating an abnormality score for document groups based on anomalous terms appearing in document groups and for ranking document groups according to their abnormality scores.

The anomaly unit 410 may also be for generating an abnormality score for a network data document based on the abnormality scores of anomalous terms appearing in the document. The anomaly unit 410 may also be for adjusting the abnormality scores of identified anomalous terms appearing in the document according to associations between the identified anomalous terms, and for adjusting the generated abnormality score for the network data document according to frequency of appearance of anomalous terms from the network data document in the rest of the document group. The anomaly unit 410 may also be for ranking network data documents according to their abnormality score.

The receiving unit 402 may also be for receiving a search query and the search unit 406 may also be for applying the search query to the network data documents, for example by filtering the network data documents to retain only those network data documents having a relevance score with respect to the search query above a threshold value. The anomaly unit 410 may also be for adjusting the generated abnormality score for a network data document according to a relevance score of the network data document with respect to a received search query.

Embodiments of the present invention thus enable enhanced anomaly detection on data from a wide variety of data sources and including structured and unstructured data in a range of different formats. Data can be ranked and grouped on the basis of the degree of abnormality of the data. Consequently, top ranked data is expected to be more related to causes of network problems and give better results for network analysis or troubleshooting. This ranking may be combined with specific search queries. For example, if a user searches for data of a network node "RNC10", abnormal data related to RNC10 will be ranked on top rather than simply sorting search results by time, relevance etc.

According to examples of the invention, all types of network data are treated as denormalised documents just like web page documents. All data documents may be parsed, analysed and indexed to provide a centralised view of all network data sources. Users are able to retrieve and analyse any relevant data by submitting a search query, and anomaly detection assists users with identifying data related to network problems by highly ranking the most anomalous data. Given any dataset, the examples of the methods described herein identify anomalies. With knowledge of anomalies, users can request retrieval of data related to those anomalies.

Examples of the present invention thus provide a generalised solution for automatic analysis of any type of network data in order to find important information for users without needing pre-defined data analysis queries by domain experts. Examples of the methods described herein are highly flexible and applicable to a wide variety of different data schemas and platforms. Examples of the methods may significantly reduce time on network troubleshooting for network operators in the many application cases where the limited existing pre-defined data analysis queries are either unsuitable, unavailable or no longer applicable following system updates.

Advantages of examples of the present invention include reduced time for finding the root cause of a problem during troubleshooting, flexibility of application to different datasets and network data and the provision of a full network view across all network data sources. Additionally, examples of the present invention do not require any specialized network or domain knowledge from a user and are able to handle both unstructured data and structured data having inconsistencies as a result of software or hardware updates or different vendors.

The methods of the present invention may be implemented in hardware, or as software modules running on one or more processors. The methods may also be carried out according to the instructions of a computer program, and the present invention also provides a computer readable medium having stored thereon a program for carrying out any of the methods described herein. A computer program embodying the invention may be stored on a computer-readable medium, or it could, for example, be in the form of a signal such as a downloadable data signal provided from an Internet website, or it could be in any other form.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method for analysing performance of a network by managing network data relating to operation of the network, the method comprising:
receiving a plurality of network data records from at least one network data source;
processing the received plurality of network data records into a plurality of network data documents, each network data document corresponding to a received network data record;
assembling the plurality of network data documents into document groups in a plurality of sliding windows, wherein the plurality of sliding windows comprises sliding windows having a window size defined by at least one of time interval or document count;
generating statistical data for terms appearing in the document groups; and
for at least one term:
performing anomaly detection upon statistical data in the document groups, wherein performing the anomaly detection comprises applying a plurality of quantitative anomaly detection algorithms to the statistical data for the at least one term, and wherein each quantitative anomaly detection algorithm, of the plurality of quantitative anomaly detection algorithms, is configured to return an abnormality score comprising a quantitative value representing a degree of abnormality in the statistical data for the at least one term, and
averaging the returned abnormality scores to generate a combined abnormality score for the at least one term; and in response to detection of an anomaly: identifying the at least one term as an anomalous term; identifying a document group containing the anomaly as an anomalous group; and identifying a network data document containing the anomalous term as an anomalous document.

2. The method as claimed in claim 1, further comprising receiving the plurality of network data records from a plurality of different network data sources.

3. The method as claimed in claim 1, wherein processing the received plurality of network data records into the plurality of network data documents comprises performing an analysis on the received plurality of network data records, the analysis comprising at least one of syntactic analysis, text mining, or Natural Language Processing.

4. The method as claimed in claim 3, wherein processing the received plurality of network data records into the plurality of network data documents further comprises assembling results of the analysis for each network data record into a corresponding network data document.

5. The method as claimed in claim 1, wherein processing the received plurality of network data records into the plurality of network data documents comprises creating an index of the received plurality of network data records and storing the created index in an index store.

6. The method as claimed in claim 1, wherein assembling the plurality of network data documents into the document groups comprises:
placing all network data documents corresponding to a single sliding window in a same document group.

7. The method as claimed in claim 1, wherein the statistical data for the at least one term comprises, for each document group, at least one value of a data statistic model for occurrence of the at least one term in said each document group.

8. The method as claimed in claim 1, further comprising: repeating, for remaining terms appearing in the document groups, the steps of:
performing the anomaly detection upon statistical data for a term, among the remaining terms, in the document groups; and
in response to detection of an anomaly: identifying the term, among the remaining terms, as an anomalous term; identifying a document group containing the anomaly as an anomalous group; and identifying a network data document containing the anomalous term as an anomalous document.

9. The method as claimed in claim 1, further comprising ranking identified anomalous terms based on frequency of occurrence of the respective identified anomalous terms.

10. The method as claimed in claim 1, further comprising ranking identified anomalous document groups based on a number of anomalous terms in each document group.

11. A computer program product comprising a non-transitory computer readable medium storing a computer program comprising instructions which, when run on a computer, cause the computer to carry out the method according to claim 1.

12. A network element for analysing performance of a network by managing network data relating to operation of the network, the network element comprising a processor and a memory, the memory containing instructions executable by the processor such that the network element is operable to:
receive a plurality of network data records from at least one network data source;
process the received plurality of network data records into a plurality of network data documents, each network data document corresponding to a received network data record;
assemble the plurality of network data documents into document groups in a plurality of sliding windows, wherein the plurality of sliding windows comprises sliding windows having a window size defined by at least one of time interval or document count;
generate statistical data for terms appearing in the document groups; and
for at least one term:
perform anomaly detection upon statistical data in the document groups, wherein the network element is operable to perform the anomaly detection by applying a plurality of quantitative anomaly detection algorithms to the statistical data for the at least one term, and wherein each quantitative anomaly detection algorithm, of the plurality of quantitative anomaly detection algorithms, is configured to return an abnormality score comprising a quantitative value representing a degree of abnormality in the statistical data for the at least one term, and
average the returned abnormality scores to generate a combined abnormality score for the at least one term; and
in response to detection of an anomaly: identify the at least one term as an anomalous term; identify a document group containing the anomaly as an anomalous group; and identify a network data document containing the anomalous term as an anomalous document.

13. The network element as claimed in claim 12, wherein the network element is further operable to process the received plurality of network data records into the plurality of network data documents by performing an analysis on the received plurality of network data records, the analysis comprising at least one of syntactic analysis, text mining, or Natural Language Processing.

14. The network element as claimed in claim 12, wherein the network element is further operable to assemble the plurality of network data documents into the document groups by:
placing all network data documents corresponding to a single sliding window in a same document group.

15. The network element as claimed in claim 12, wherein the network element is further operable to:
receive a search query;
apply the search query to the plurality of network data documents; and
assemble the plurality of network data documents into the document groups after application of the search query.

* * * * *